July 30, 1957     E. H. HOLDEN     2,800,848
DUAL HITCH DISK PLOW

Filed Aug. 13, 1954     2 Sheets-Sheet 1

INVENTOR
Elmer H. Holden

ATTORNEY

July 30, 1957     E. H. HOLDEN     2,800,848
DUAL HITCH DISK PLOW

Filed Aug. 13, 1954     2 Sheets-Sheet 2

INVENTOR
Elmer H. Holden

ATTORNEY

United States Patent Office 2,800,848
Patented July 30, 1957

2,800,848
DUAL HITCH DISK PLOW

Elmer H. Holden, Poplarville, Miss.

Application August 13, 1954, Serial No. 449,627

8 Claims. (Cl. 97—47.62)

The present invention relates to ground working equipment and more particularly to a dual hitch one-way disk plow for use in cultivating close to rows of trees and other vegetation.

Heretofore various types of plows, harrows and disk harrows have been used in agricultural work and have partially solved the problem of cultivation, but they have not been entirely satisfactory, particularly where the cultivation is to be one close to existing vegetation. The prior art cultivators have generally been dragged behind draft animals or draft vehicles and the control thereof has not been satisfactory since the depth of cultivation could not be accurately controlled. Particularly when prior types of multiple disk plows were used, some disks would bite into the earth to a greater depth than others resulting in irregular depth of cultivation with different disks on the same plow.

It is an object of the present invention to provide a disk plow which may be used on existing draft vehicles without modification of such vehicles and which disk plow will more positively break up the soil and comminute the organic matter on the soil.

Another object of the invention is to provide a cultivator or disk plow which may be positioned with one side of the plow cultivator projecting laterally beyond the tractor wheels on either side of the tractor.

Another object of the invention is to provide a disk plow in which the angularity of the disks may be changed relative to the direction of movement by simple connections.

A further object is to provide a disk plow in which the depth of cut may be accurately controlled.

A further object of the invention is to provide a disk plow in which the cutting portions of the disks may be adjusted to penetrate the soil a predetermined amount.

Figure 1:
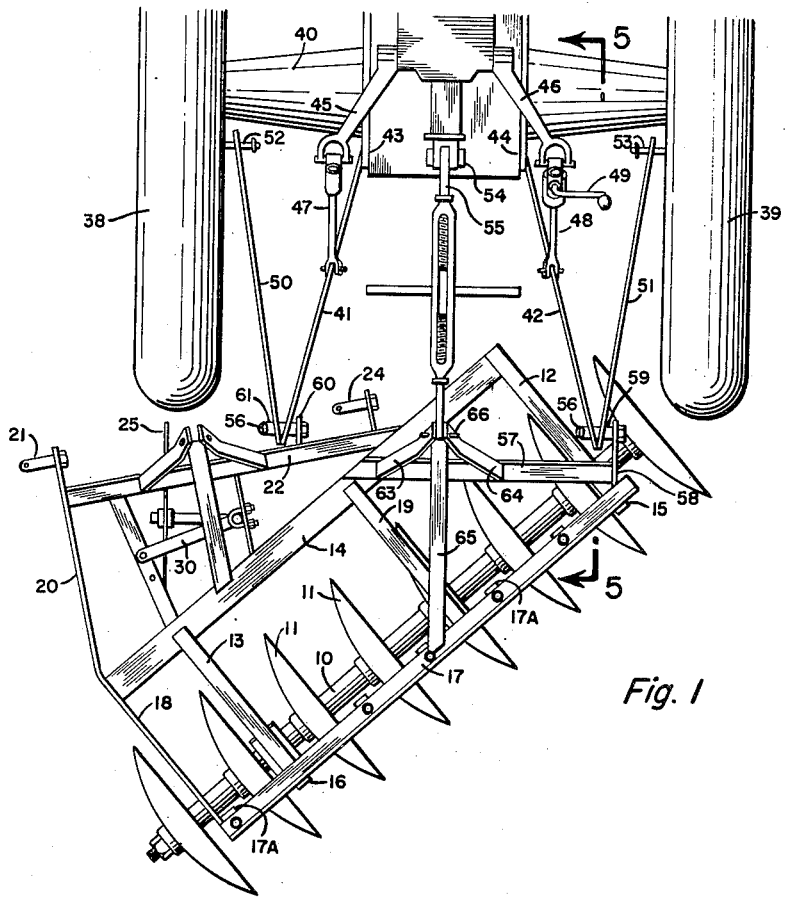
Figure 2:
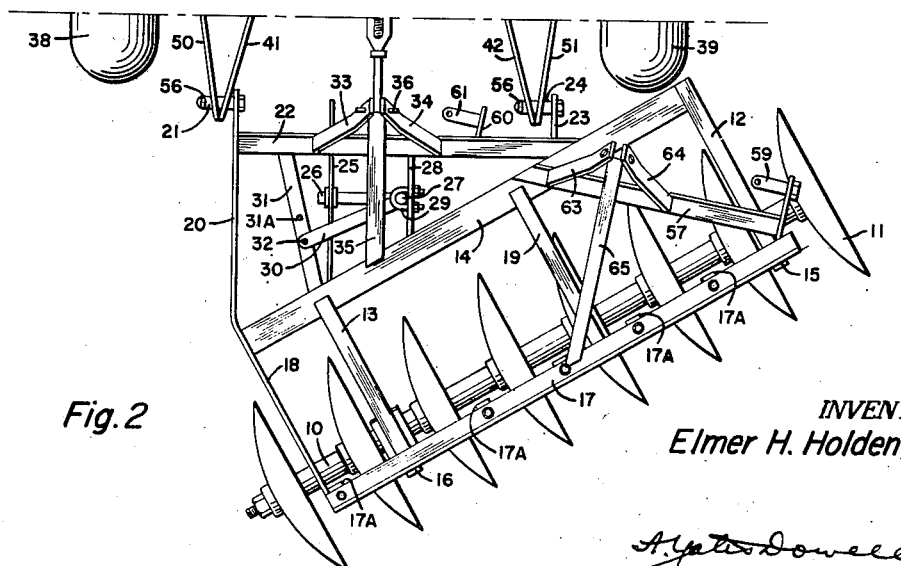
Figure 3:
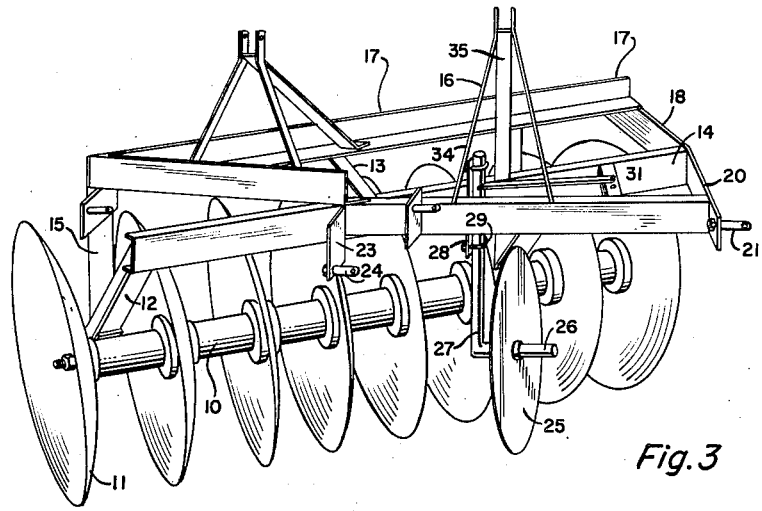
Figure 4:
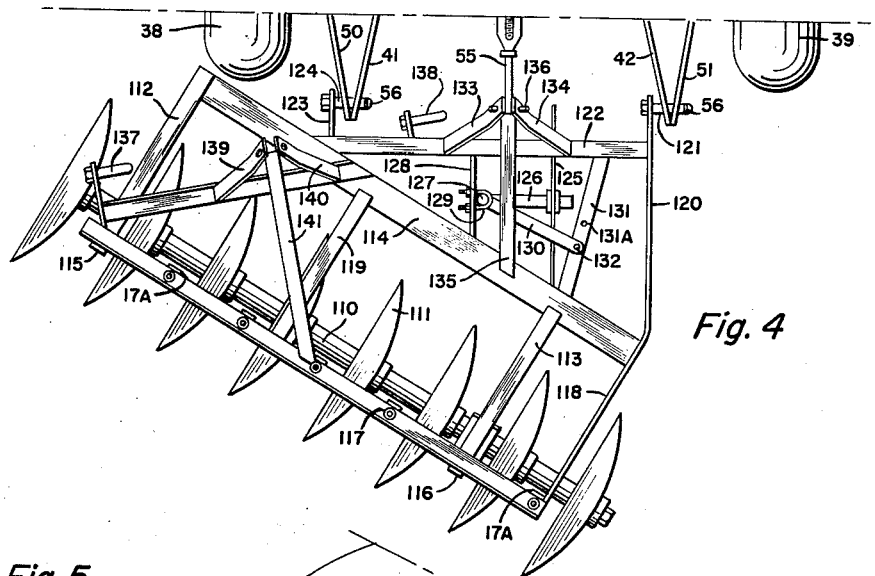
Figure 5:
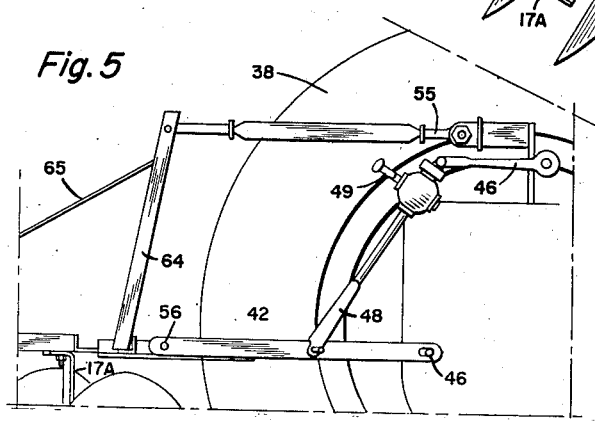

Other and further objects will be apparent as the description proceeds and upon reference to the drawings wherein:

Fig. 1 is a plan view of the disk plow of the present invention connected by one set of pivot studs adjacent the leading disk to a tractor in which the earth is turned over toward the right;

Fig. 2, a plan view of the disk plow of Fig. 1 connected by its other set of pivot studs to the tractor;

Fig. 3, a perspective view of the disk plow of Figs. 1 and 2;

Fig. 4, a plan view similar to Fig. 1 of a disk plow for turning the earth toward the left, and Fig. 5, a fragmentary view taken approximately on line 5—5 of Fig. 1 showing the drawbar and turnbuckle linkages with their adjustments for pulling and controlling the disk plow.

The present invention includes a frame having a plurality of disks rotatably mounted thereon and two pairs of pivot studs for pivotal connection with the pair of drawbars on a tractor and a tripod associated with each pair of pivot studs and connected by a turnbuckle adjusted link pivoted to the tractor and the associated tripod for positively controlling the depth of cut of the cutter disks and providing for adjusting the plane of cutting of the cutter disks. The disk plow is provided with an adjustably mounted coulter wheel in which the angularity of such coulter wheel may be varied for controlling the side thrust and depth of cutting in various types of soil. The disk plow may be used for cultivation outside of the path of the tractor such as cultivating close to trees in orchards and the like. The two sets of pivot studs and tripods provide for varying the angle of the cutter disks relative to the direction of movement and also provide for lateral displacement of the disk plow.

Referring more particularly to the drawings wherein like reference numerals refer to like parts throughout, the dual hitch one-way disk plow of the present invention comprises a shaft 10 on which a plurality of cutting disks 11 are rotatably mounted. Upwardly and forwardly extending struts 12 and 13 are secured at their lower ends to the shaft 10 and at their upper ends are secured to a horizontal bar 14. Upright struts 15 and 16 are secured at their lower ends to the lower ends of the struts 12 and 13 and at their upper ends are fixed to a second horizontal bar 17, the horizontal bars 14 and 17 being connected together by transverse members 18 and 19. The horizontal bars 14 and 17 and connecting bars 18 and 19 form a rigid frame which is supported by struts 12, 13, 15 and 16 from the shaft 10, which is supported by rotatable cutting disks 11.

If desired, suitable scrapers 17A supported on horizontal bar 17 and extending to shaft 10 may be provided for preventing the accumulation of trash on the plow. Extending forwardly from connecting bar 18 as an extension thereof is a bar 20 having a pivot stud 21 fixed at its forward end. An angle bar 22 is fixed at one end to forwardly extending bar 20 and at its other end to horizontal bar 14 and a plate 23 having a pivot stud 24 is fixed to the angle bar 22 by welding or other suitable means.

A coulter blade 25 is pivotally mounted on a stub shaft 26 carried by upright shaft 27 fixed to a supporting plate 28 by means of U-bolts 29, the supporting plate 28 being fixed to angle bar 22 and horizontal bar 14 by welding or the like. A control arm 30 is fixed to the upright shaft 27 and is provided with an aperture at its outer end, the arm 30 serving to adjust the angularity of the coulter blade 25, the adjustment being obtained by means of a member 31 extending between and fixed to angle bar 22 and horizontal bar 14, one or more apertures 31A being provided in the member 31 for receiving a pin or bolt 32 through the aperture in adjusting arm 30 for locking the coulter blade in adjusted position.

Converging uprights 33 and 34 are fixed at their lower ends to angle bar 22 and a forwardly and upwardly extending member 35 is fixed at its lower end to horizontal bar 14 and at its upper end to the upper ends of converging members 33 and 34 thereby providing a tripod, the upper ends of members 33 and 34 being provided with apertures for receiving a pin 36.

A tractor having rear wheels 38 and 39 supporting an axle housing 40 is provided with drawbars 41 and 42 pivotally connected to the tractor at 43 and 44, respectively. The drawbars are raised and lowered by power arms 45 and 46, respectively, which are raised and lowered in a conventional manner by hydraulic means or the like under the control of the tractor operator. A link 47 connects the free end of power arm 45 to an intermediate point on drawbar 41, while an adjustable link 48 connects the free end of power arm 46 to an intermediate point on drawbar 42. The adjustable link 48 may be varied in length by means of a crank 49 operating a screw or the like through suitable gearing thereby providing for varying the relative heights of the rear or free ends of drawbars 41 and 42. Stabilizing links 50 and 51 are pivoted to the tractor on studs 52 and 53, respectively, which are in substantial alignment with pivots 43 and 44.

A fixed pivot 54 is provided on the tractor above the pivots 43, 44, 52 and 53 and a turnbuckle adjusting link 55 is pivotally mounted on such pivot 54 with its other end pivotally connected to the pivot pin 36 at the upper end of the tripod formed by the converging members 33, 34, and 35, while the free or rear ends of drawbar arms 41 and 42 and stabilizing links 50 and 51, respectively, are connected to pivot studs 21 and 24, respectively, such free ends being retained by means of suitable cotter pins 56 or the like.

With the disk plow connected to the tractor in the manner shown in Fig. 2, the cutting disks 11 are arranged so that the disk on the extreme right projects laterally beyond the tractor relative to the path of movement. In such position the disk plow may be used for cultivating close to trees and other vegetation since the tractor wheel 39 is spaced inwardly an appreciable distance from the cutter disk 11 at the extreme right.

Referring to Fig. 1, another angle bar 57 extends diagonally from and has one end fixed to an intermediate point on forward horizontal bar 14, the other end being secured to a plate 58 projecting forwardly from horizontal bar 17 and carrying a pivot stud 59 which is connected to the free ends of drawbar 42 and stabilizing link 51, a cotter pin 56 locking the drawbar and link on the first stud. A plate 60 is fixed to the angle bar 22 and carries a pivot stud 61 which extends through the apertures in the free or rear ends of drawbar 41 and stabilizing link 50 which are prevented from disconnection by means of a cotter pin 56 or the like. A second tripod is formed from converging struts 63 and 64 secured at their lower ends to angle bar 57 and a third strut member 65 is secured at its lower end to rear horizontal member 17 and to the upper ends of converging struts 63 and 64. A pin 66 which may be provided with suitable cotter pins passes through the outer end of turnbuckle adjusting link 55 and through apertures in the upper ends of converging struts 63 and 64.

It will be noted that the coulter disk 25 is adjusted in a different angular position in Fig. 1 from that shown in Fig. 2 and it will also be noted that the pivot studs 21 and 24 are in different angular relation to the cutter disks 11 than the pivot studs 51 and 59, respectively, thereby obtaining a different angular relation to the cutter disks 11 relative to the direction of movement of the tractor and disk plow in the two situations. It will also be noted that the lateral displacement of the disk plow is changed by the use of different sets of pivoted studs. The arrangements provide for supporting the disk plow in close relation to the tractor and in close relation to the sides of the tractor, thereby permitting extremely close cultivation either to move the soil on to the row being cultivated or to move the soil away from the edge of the cultivation area.

Referring to Fig. 4, one form of the disk plow cultivator is shown in which the parts are inverted and the plow disks turn the earth to the left instead of to the right. A shaft 110 rotatably supports a plurality of cutting disks 111 and extending upwardly and forwardly from the shaft 110 are struts 112 and 113 which extend to forward horizontal bar 114, while upwardly extending struts 115 and 116 extend from the rear or lower ends of struts 112 and 113 and are secured to a rearwardly extending bar 117, the bars 114 and 117 being interconnected by members 118 and 119. A forward extension 120 of connecting member 118 carries a pivot stud 121 which is connected to drawbar 42 and stabilizing link 51, a cotter pin 56 serving to retain the drawbar 42 and stabilizing link 51 on the stud 121. A bar 122 extends from forward extension 120 to an intermediate point on horizontal bar 114 and carries a plate 123 which in turn supports a pivot stud 124 over which the stabilizing link 50 and drawbar 41 are impaled and prevented from removal by a cotter pin 56.

A coulter wheel 125 is mounted on shaft 126 which extends laterally from a vertical shaft 127 mounted on a plate 128 extending between horizontal bar 114 and bar 122. Shaft 127 is secured to plate 128 by means of U-bolts 129 while an arm 130 extends outwardly from the vertical shaft 127 to a strut 131 extending between horizontal bar 114 and bar 122, the free end of arm 131 being provided with an aperture for registration with apertures 131A for receiving a pin or bolt 132 for retaining the coulter blade in proper angular relation. A tripod formed of upwardly extending struts 133 and 134 and a forwardly and upwardly extending strut 135 carries a pin 136 which extends through apertures in the upper ends of struts 133 and 134 and through an aperture in the turnbuckle link 155.

The disk plow shown in Fig. 4 may also be attached to another set of pivot studs 137 and 138 and a tripod formed from struts, 139, 140 and 141, to the drawbars and stabilizing links and the adjustable turnbuckle link thereby providing a different angular adjustment as well as a change in the lateral position of the disk plow. The left hand plow of Fig. 4 is, therefore, suitable for use in close cultivation to the right or the left of the tractor.

It will be noted pivot pin 24 is located at a lower elevation than pivot pin 21 and also that pivot pin 59 is located at a lower elevation than pivot pin 61. The reason for this arrangement is to provide for additional elevation of the leading end of the disk plow since the adjustment provided by the adjustable link 48 is limited. This permits the adjacent wheel of the tractor to ride in a furrow and provides for proper adjustment of the disk plow for filling the furrow and so that the disk plow can uniformly work the ground to an equal depth, even though the tractor is not level.

It will be apparent that the coulter blade 125 will be adjusted to the desired angularity and that other apertures 131A may be provided as necessary to obtain other angular positions.

From the above description it will be apparent that the dual hitch one-way plow of the present invention can be connected to the three-way support of a tractor and the angularity of the plow can be varied by the use of the different sets of pivot studs and tripods and the left side or right side of the disk plow can be raised or lowered in accordance with the adjustment of link 48 by means of the handle 49, while the depth of the coulter blade can be adjusted by means of the turnbuckle in link 55 so that the coulter blade will permit the proper contact of the cutting disks 11 with the earth.

It will be obvious to those skilled in the art that various changes may be made in the invention without departing from the spirit and scope thereof and, therefore, the invention is not limited by that which is shown in the drawings and described in the specification, but only as indicated in the appended claims.

What is claimed is:

1. A disk plow for use with a conventional three-point hitch system of a tractor comprising a first generally horizontally extending bar, for positioning at an acute angle to the path of movement of the tractor and plow, a second generally horizontally extending bar generally parallel to said first bar and connected by braces to said first bar forming a frame, a plurality of cultivating disks rotatably mounted on said frame on an axis generally parallel to said bars, a forwardly extending strip projecting from the trailing end of the frame, an angle bar extending inwardly from said forwardly projecting strip to said first bar intermediate the ends of said first bar, a tripod mounted on said angle bar and said first horizontal bar extending upwardly to provide a pivot, a stud projecting laterally from said forwardly extending strip, a second stud spaced forwardly of said angle bar adjacent the connection of said angle bar and said first horizontal bar and spaced downwardly therefrom, the said first and second studs being designed to engage the free ends of drawbar arms and stabilizer arms of a tractor in which the drawbar arms may be positively raised and lowered, the pivot of the tripod being connectable to a turnbuckle adjusted control arm pivoted to the tractor above the pivot points of the drawbar arms of the tractor whereby the disk plow may be raised and lowered with a generally parallel motion, one of said drawbar arms being vertically adjustable relative to the other drawbar arm whereby the plow may be adjusted to raise or lower its ends located laterally of the direction of movement of the tractor and the plow, a second angle bar fixed to the horizontal members and extending at a small angle to said first angle bar, a third stud mounted on the outer end of said second angle bar for connection with one of said drawbar arms, a fourth stud mounted on said first angle bar between the first and second studs for connection to the other drawbar arm, a second tripod mounted on said second angle bar and said second horizontal bar and having a pivot at its upper end for connection to said turnbuckle arm, said pivot studs and said tripods serving to mount the plow relative to the tractor for close cultivating to rows of trees or vegetation on either side of the tractor, whereby the single plow may perform dual functions.

2. A disk plow for use with a conventional three-point hitch system of a tractor comprising a first generally horizontally extending bar, for positioning at an acute angle to the path of movement of the tractor and plow, a second generally horizontally extending bar generally parallel to said first bar and connected by braces to said first bar forming a frame, a plurality of cultivating disks rotatably mounted on said frame on an axis generally parallel to said bars, a forwardly extending strip projecting from the trailing end of the frame, an angle bar extending inwardly from said forwardly projecting strip to said first bar intermediate the ends of said first bar, a tripod mounted on said angle bar and said first horizontal bar extending upwardly to provide a pivot, a stud projecting laterally from said forwardly extending strip, a second stud spaced forwardly of said angle bar adjacent the connection of said angle bar and said first horizontal bar and spaced downwardly therefrom, the said first and second studs being designed to engage the free ends of drawbar arms and stabilizer arms of a tractor in which the drawbar arms may be positively raised and lowered, the pivot of the tripod being connectable to a turnbuckle adjusted control arm pivoted to the tractor above the pivot points of the drawbar arms of the tractor whereby the disk plow may be raised and lowered with a generally parallel motion, one of said drawbar arms being vertically adjustable relative to the other drawbar arm whereby the plow may be adjusted to raise or lower its ends located laterally of the direction of movement of the tractor and the plow, a second angle bar fixed to the horizontal members and extending at a small angle to said first angle bar, a third stud mounted on the outer end of said second angle bar for connection with one of said drawbar arms, a fourth stud mounted on said first angle bar between the first and second studs for connection to the other drawbar arm, a second tripod mounted on said second angle bar and said second horizontal bar and having a pivot at its upper end for connection to said turnbuckle arm, said pivot studs and said tripods serving to mount the plow relative to the tractor for close cultivating to rows of trees or other vegetation on either side of the tractor, whereby the single plow may perform dual functions, an L-shaped support arranged with one arm in upright position and pivotally mounted on said frame, the other arm of said L-shaped support having a coulter blade rotatably mounted thereon, an adjustment arm fixed to siad upright arm of said L-shaped support and having its free end movable for adjusting the angularity of said coulter blade and means to fix said L-shaped support in adjusted position.

3. The invention according to claim 1 in which the axis of said first and second studs are in different angular relation to the axis of the disks than the axis of said second and third studs whereby the angularity of the disk plow is varied with the different connections.

4. A disk plow for use with a conventional three-point hitch system of a tractor comprising a frame, a plurality of cultivating disks rotatably mounted on said frame, a first tripod mounted on said frame to provide a pivot, a first stud projecting laterally from said frame adjacent one end, a second stud spaced laterally of said first stud and spaced downwardly therefrom, the said first and second studs being designed to engage the free ends of drawbar arms and stabilizer arms of a tractor in which the drawbar arms may be positively raised and lowered, the pivot connection of the tripod being connectable to an adjustable control link pivoted to the tractor above the pivot connection of the drawbar arms to the tractor whereby the disk plow may be raised and lowered with a generally parallel motion, said pivot connection of said first tripod being approximately midway between said first and second studs, one of said drawbar arms being vertically adjustable relative to the other drawbar arm whereby the plow may be adjusted to raise or lower its ends located laterally of the direction of movement of the tractor and the plow, a third stud mounted on the other end of said frame for connection with one of said drawbar arms, a fourth stud mounted on said frame between the first and second studs for connection to the other drawbar arm, a second tripod mounted on said frame and having a pivot at its upper end for connection to said adjustable control arm, said pivot connection of said second tripod being approximately midway between said third and fourth studs, said pivot studs and said tripods serving to mount the plow relative to the tractor for close cultivation to rows of trees or vegetation on either side of the tractor whereby the single plow will perform dual functions and can be laterally adjusted a distance less than the spacing between said first and second studs.

5. The combination comprising a disk plow, a tractor having a three-point hitch system, said plow including a frame, a plurality of cultivating disks rotatably mounted on said frame, a first tripod mounted on said frame and extending upwardly to provide a pivot, a first stud projecting laterally from said frame, a second stud spaced laterally inward from said first stud and spaced downwardly from said first stud, the said first and second studs engaging the free ends of drawbar arms and stabilizer arms of the tractor, the drawbar arms being positively raised and lowered, the pivot connection of the tripod being connected to the turnbuckle control link pivoted to the tractor above the pivot points of the drawbar arms whereby the disk plow may be raised and lowered with a generally parallel motion, said pivot connection of said first tripod being approximately midway between said first and second studs, one of said drawbar arms being vertically adjustable relative to the other drawbar arm whereby the plow may be adjusted to raise or lower its ends located laterally of the direction of movement of the tractor and the plow, a third stud mounted on the outer end of said frame for connection with one of said drawbar arms, a fourth stud mounted on said frame between the first and second studs for connection to the other drawbar arm, a second tripod mounted on said frame and having a pivot at its upper end for connection to said turnbuckle control link, said pivot connection of said second tripod being approximately midway between said third and fourth studs, said studs and said tripods mounting said plow relative to the tractor for close cultivating to rows of trees or vegetation on either side of the tractor whereby the single plow will perform dual functions and can be laterally adjusted a distance less than the spacing between said first and second studs.

6. A disk plow comprising a frame, a plurality of cultivating disks rotatably mounted on said frame, a first upwardly extending tripod mounted on said frame, said first tripod having a pivot at its upper end, a first pivot on said frame adjacent one side thereof, a second pivot spaced inwardly of said first pivot, the said first and second pivots being attachable to a draft vehicle, the pivot of said tripod being attachable to the draft vehicle at a point spaced from and out of line with said first and second pivots, said pivot of said first tripod being located approximately midway between said first and second pivots, a third pivot mounted on the other side of said frame and connectable with the draft vehicle, a fourth pivot mounted on said frame between the first and second pivots for connection to another pivot on the draft vehicle, a second tripod mounted on said frame and having a pivot at its upper end out of alignment with said third and fourth pivots for connection to said draft vehicle, said pivot of said second tripod being located approximately midway between said third and fourth pivots, said pivots serving to mount the plow relative to the tractor for close cultivating to rows of trees or vegetation on either side of the tractor whereby the single plow may perform dual functions and can be laterally adjusted a distance less than the spacing between said first and second pivots.

7. A cultivator comprising a main substantially horizontal elongated frame having a forward portion, cultivator elements carried by the frame and depending below the frame, a secondary L-shaped frame having the free end of one of its members connected adjacent to an end of the main frame on the forward portion of the main frame, the free end of the other member being connected adjacent to the forward portion of the main frame and remote from the free end of the first mentioned member, a first pair of complementary attaching means, one being provided adjacent to an end of the main frame and rearwardly of the forward portion and the other being mounted on the secondary frame and spaced substantially from the last mentioned end of the main frame, upstanding support means mounted on the main frame intermediate the attaching means, a second pair of complementary attaching means mounted on the forward portion of the secondary frame, one being mounted adjacent to each end of said frame, and an upstanding support means mounted on said secondary frame intermediate said last mentioned attaching means.

8. A cultivator comprising a main substantially horizontal elongated frame having a forward portion, cultivating elements carried by the frame and depending below the frame, a secondary frame mounted on the forward portion of the main frame and having an elongated member disposed at an angle to the main frame and projecting forwardly thereof, a first pair of attaching means, one being provided adjacent to an end of the main frame and rearwardly of the forward portion and the other being mounted on the secondary frame and spaced substantially from the last mentioned end of the main frame, upstanding support means mounted on the main frame intermediate the attaching means, a second pair of attaching means mounted on the forward portion of the secondary frame, one being mounted adjacent to each end of said frame, and a second upstanding support means mounted on said secondary frame intermediate said last mentioned attaching means.

References Cited in the file of this patent

UNITED STATES PATENTS

| | | |
|---|---|---|
| 2,467,111 | Coon | Apr. 12, 1949 |
| 2,562,486 | Denning | July 31, 1951 |
| 2,658,770 | Koenig | Nov. 10, 1953 |
| 2,685,240 | Wilson et al. | Aug. 3, 1954 |
| 2,704,017 | Wilson | Mar. 15, 1955 |